US012115553B2

(12) United States Patent
Hepler

(10) Patent No.: US 12,115,553 B2
(45) Date of Patent: Oct. 15, 2024

(54) 180 DEGREE PIVOTABLE AND TELESCOPING PAINT ROLLER FRAME

(71) Applicant: Melanie Hepler, Leesburg, FL (US)

(72) Inventor: Melanie Hepler, Leesburg, FL (US)

( * ) Notice: Subject to any disclaimer, the term of this patent is extended or adjusted under 35 U.S.C. 154(b) by 352 days.

(21) Appl. No.: 17/580,764

(22) Filed: Jan. 21, 2022

(65) Prior Publication Data

US 2022/0362800 A1 Nov. 17, 2022

Related U.S. Application Data

(60) Provisional application No. 63/188,110, filed on May 13, 2021.

(51) Int. Cl.
*B05C 17/02* (2006.01)
*B25G 3/38* (2006.01)

(52) U.S. Cl.
CPC ........ *B05C 17/022* (2013.01); *B05C 17/0205* (2013.01); *B05C 17/0217* (2013.01); *B25G 3/38* (2013.01)

(58) Field of Classification Search
CPC ............ B05C 17/0205; B05C 17/0217; B05C 17/022; B25G 3/38
USPC .................................. 15/144.2; 403/76, 305
See application file for complete search history.

(56) References Cited

U.S. PATENT DOCUMENTS 303,517 A * 8/1884 Hubbard .................. A47L 1/08 401/23
3,419,931 A * 1/1969 Willig .................. B05C 17/022 403/162
3,866,257 A * 2/1975 Cansdale, Sr. ........... B25G 3/38 403/115
5,379,723 A * 1/1995 Branley ............... A01K 13/002 119/633
5,903,952 A * 5/1999 Camp, Jr. ............. B05C 17/022 492/19
6,073,298 A * 6/2000 O'Brien ............... A46B 5/0091 15/160
6,702,727 B2 * 3/2004 Karsten ................ B05C 17/022 492/19
7,533,437 B1 * 5/2009 Gartner ................... B05C 17/00 15/210.1
2012/0163903 A1 * 6/2012 Williams ............. B05C 17/022 403/104

(Continued)

FOREIGN PATENT DOCUMENTS

WO WO-2011162827 A1 * 12/2011 ............... B05C 1/08

*Primary Examiner* — Randall E Chin
(74) *Attorney, Agent, or Firm* — Brennan, Manna & Diamond, LLC

(57) ABSTRACT

The present invention relates to a paint roller frame for application of a fluid, such as a paint or stain, on any surface. The paint roller includes a head section that can accommodate roller covers or paint rollers of various sizes by adjusting a length of a top edge that adjusts the distance between connectors configured for holding the roller cover. The frame includes an adjustable swivel that enables a pivotal movement of a pole section relative to the head section. The pole section can be secured to the swivel which enables users to rotate the attached roller cover in a range of motion generally 90-degrees on either side of the perpendicular direction to the head section. The pole section can be telescoping and enables users to paint elevated areas, thereby obviating a ladder or stepstool.

12 Claims, 6 Drawing Sheets

(56) References Cited

U.S. PATENT DOCUMENTS

| | | | | |
|---|---|---|---|---|
| 2015/0196932 | A1* | 7/2015 | Carlson | B05C 17/022 15/144.1 |
| 2016/0333924 | A1* | 11/2016 | Aviles | F16C 11/06 |
| 2018/0304300 | A1* | 10/2018 | Arvinte | B05C 17/0217 |
| 2022/0280965 | A1* | 9/2022 | Buckel, Jr. | B05C 1/0808 |

* cited by examiner

180 DEGREE PIVOTABLE AND TELESCOPING PAINT ROLLER FRAME

CROSS-REFERENCE TO RELATED APPLICATION

The present application claims priority to, and the benefit of, U.S. Provisional Application No. 63/188,110, which was filed on May 13, 2021 and is incorporated herein by reference in its entirety.

FIELD OF THE INVENTION

The present invention relates generally to the field of fluid applicators. More specifically, the present invention relates to an adjustable and swivelable paint roller frame that can be used with roller covers of various sizes. More specifically, the adjustable paint roller frame is a portable device that enables operators to reach elevated areas, narrow areas and hard to reach areas. The frame includes a handle, an adjustable swivel, and a head section. The head section receives and accommodates roller covers and the handle is configured to be pivotally movable 90-degrees left and right, relative to the substantial midpoint of the head section enabling a smooth and consistent paint application. Accordingly, the present disclosure makes specific reference thereto. Nonetheless, it is to be appreciated that aspects of the present invention are also equally applicable to other like applications, devices, and methods of manufacture.

BACKGROUND

By way of background, application of paints and coatings require a paint roller. A paint roller is a paint application tool used for painting flat surfaces rapidly and efficiently. The paint roller uses a roller cover that absorbs paint and transfers it to a painted surface. The roller cover is secured to a head section that is often attached to a handle. In conventional rollers, the roller cover is simply pushed onto the frame or head. Thus, the fit is tight, making it difficult to get the roller cover off the frame after painting. Operators may be reluctant to remove the roller cover after painting, and thus the roller cover is saturated with paint, makes a mess, and ultimately paint that could have been applied to a surface is wasted. Individuals desire paint rollers that allow users to remove and attach roller covers easily.

Further, conventional rollers do not accommodate roller covers of multiple sizes, and thus require individuals to carry multiple frames for different types of roller covers. This is expensive, uncomfortable for operators and consumes unnecessary storage space.

Even with expensive rollers, operators find it difficult to paint elevated areas, narrow areas, and other hard-to-reach areas. Heretofore known paint devices comprise a handle and head section that generally remain fixed relative to each other, wherein the handle remains perpendicular to the head section or the roller cover, and therefore do not allow painting in different orientations and painting angles.

Therefore, there exists a long felt need in the art for an improved paint roller frame that facilitates easy removal of a roller cover. There is also a long felt need in the art for an improved paint roller frame that can accommodate roller covers of various sizes. Additionally, there is a long felt need in the art for an improved paint roller frame that can enable users to reach and paint hard-to-reach areas and elevated areas. Moreover, there is a long felt need in the art for an improved paint roller frame that enables individuals to paint in different painting angles. Further, there is a long felt need in the art for an improved paint roller frame that is easy to store and use. Furthermore, there is a long felt need in the art for an improved paint roller frame that maintains an easy-on and easy-off installation of the paint roller cover. Finally, there is a long felt need in the art for an improved paint roller frame that prevents excessive mess and wastage of paint, and improves overall workflow when painting any type of surface.

The subject matter disclosed and claimed herein, in one embodiment thereof, comprises a telescoping and adjustable fluid applicator device. The fluid applicator device enables users to securely attach or remove a paint roller cover and enables the cover to rotate generally from about 90-degrees left to about 90-degrees right. The device features a head section including a telescopic top edge that has a pair of opposing ends wherein each end has a connector for accommodating the roller cover. The length of the telescopic top edge can be adjusted to accommodate various sizes of roller covers. The device also includes a telescopic handle having a top end and an opposite projection end, a plurality of locking tabs is positioned at the projection end. An adjustable swivel is attached to a mounting assembly, wherein the mounting assembly is removably-attached to the head section, and the handle and the head section are pivotally-coupled using the adjustable swivel enabling ninety-degree rotation of the handle relative to the perpendicular direction of the head section. This enables users to maintain smooth and consistent paint application, thereby improving overall workflow when painting.

In this manner, the pivotable and telescoping paint roller frame of the present invention accomplishes all of the forgoing objectives and provides a modified paint roller frame with a multipurpose adjustable swivel. The head section can accommodate roller covers of multiple sizes and an operator can reach elevated and hard-to-reach areas. The connectors allow easy-on and easy-off installation of the paint roller cover from the head section. The adjustable swivel enables users to rotate the roller cover 90-degrees left and right to maintain smooth, consistent paint application.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a telescoping, adjustable and swivelable fluid applicator device. The fluid applicator device is designed to enable users to securely attach a paint roller cover and to enable the cover to rotate 90-degrees left and right for an efficient application process. The device further comprising: a head section including a telescopic top edge having a pair of opposing ends, each end having a connector for accommodating the roller cover; the length of the telescopic top edge can be adjusted to accommodate various sizes of roller covers; a telescopic handle having a top end and an opposite projection end; an ergonomic grip positioned at the top end and a plurality of locking tabs at the projection end; an adjustable swivel attached to a mounting assembly wherein the mounting assembly is removably-attached to the head section; and, the handle and the head section are pivotally coupled using the adjustable swivel enabling ninety-degree rotation of the handle relative to the perpendicular direction of head section.

In yet another embodiment, a length of the telescopic top edge can be increased by pulling the connectors away from each other and thus accommodating a roller cover of longer length in the head section. The length of the telescopic top edge can be decreased by pushing the connectors towards each other and thus accommodating a roller cover of shorter length in the head section.

In yet another embodiment, the locking tabs of the handle are received by locking slots of the swivel wherein the locking tabs are aligned and locked with the locking slots for secure and removable attachment of the swivel and the handle.

In yet another embodiment of the present invention, an adjustable paint roller frame is disclosed. The adjustable paint roller frame includes a handle, an adjustable swivel, and a head section. The handle is configured to secure to the adjustable swivel enabling the handle to pivotally move 90-degrees in either side of the transversal direction of midpoint of the head section. The head section is configured to removably-hold a roller cover wherein the head section includes a telescopic top edge that can be adjusted in length to accommodate roller covers of various sizes.

In yet another embodiment, the swivel includes a ball joint wherein a ball is supported by a socket area. The ball is pressed against the socket area enabling the pivotal movement of the handle relative to the head section.

In yet another embodiment of the present invention, the head section includes a mounting assembly to which the adjustable swivel is integrated. The adjustable swivel enables the roller frame to easily reach elevated and hard-to-reach areas. Numerous other benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
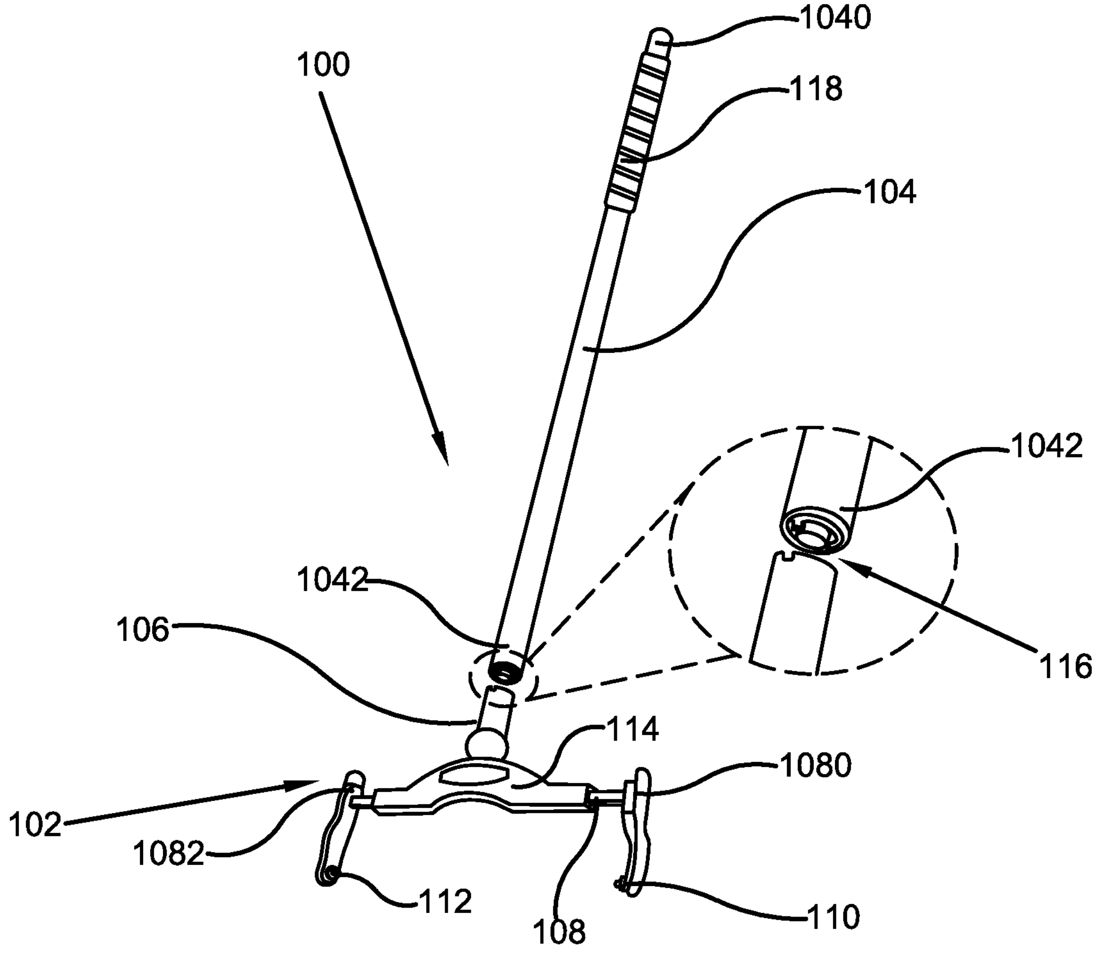
FIG. 1 illustrates a perspective view of one potential embodiment of an adjustable paint roller frame device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long felt need in the art for an improved paint roller frame that facilitates easy removal of a roller cover. There is also a long felt need in the art for an improved paint roller frame that can accommodate roller covers of various sizes. Additionally, there is a long felt need in the art for an improved paint roller frame that can enable users to reach and paint hard-to-reach areas and elevated areas. Moreover, there is a long felt need in the art for an improved paint roller frame that enables individuals to paint in different painting angles. Further, there is a long felt need in the art for an improved paint roller frame that is easy to store and use. Furthermore, there is a long felt need in the art for an improved paint roller frame that maintains an easy-on and easy-off installation of the paint roller cover. Finally, there is a long felt need in the art for an improved paint roller frame that prevents excessive mess and wastage of paint and improves overall workflow when painting any type of surface.

The present invention, in one exemplary embodiment, is a novel paint roller frame is disclosed. The paint roller frame includes a handle, an adjustable swivel and a head section. The handle is configured to secure to the adjustable swivel using a locking means, thereby enabling the handle to pivotally move 90-degrees in either side of the transversal direction of a midpoint of the head section. The head section is configured to removably hold a roller cover wherein the head section includes a telescopic top edge that can be adjusted in length to accommodate roller covers of various sizes.

Referring initially to the drawings, FIG. 1 illustrates a perspective view of one potential embodiment of the adjustable paint roller frame device of the present invention in accordance with the disclosed architecture. The adjustable paint roller frame device 100 of the present invention is a unique paint roller frame to which a paint roller cover or paint roller can be securely-attached and features an adjustable swivel enabling the frame to rotate generally from about 90-degrees left to about 90-degrees right, and enabling users to rotate the frame 100 to obtain the desired degree of angle. More specifically, the adjustable paint roller frame 100 includes a head section 102 and a telescopic pole 104. The telescopic pole 104 includes a top end 1040 having an ergonomic grip 118 and a projection end 1042 having projecting tabs to fit into a swivel 106. The head section 102 and the telescopic pole 104 are removably attached to each other via the adjustable swivel 106. The head section 102 includes a telescopic top edge 108 and a pair of paint roller cover connectors 110, 112 extending selectively from the opposing ends 1080, 1082, respectively, of the telescopic top edge 108. A length of the telescopic top edge 108 can be adjusted, thereby enabling the distance between the paint roller cover connectors to increase or decrease enabling paint roller covers of various sizes to be accommodated by the head section 102. The adjustable head section 102 described supra enables a user to use the frame 100 for painting a variety of items. On the top edge 108, the swivel 106 is mounted using the mounting assembly 114 wherein the mounting assembly 114 can be integrated or removably attached to the top edge 108.

Figure 3:
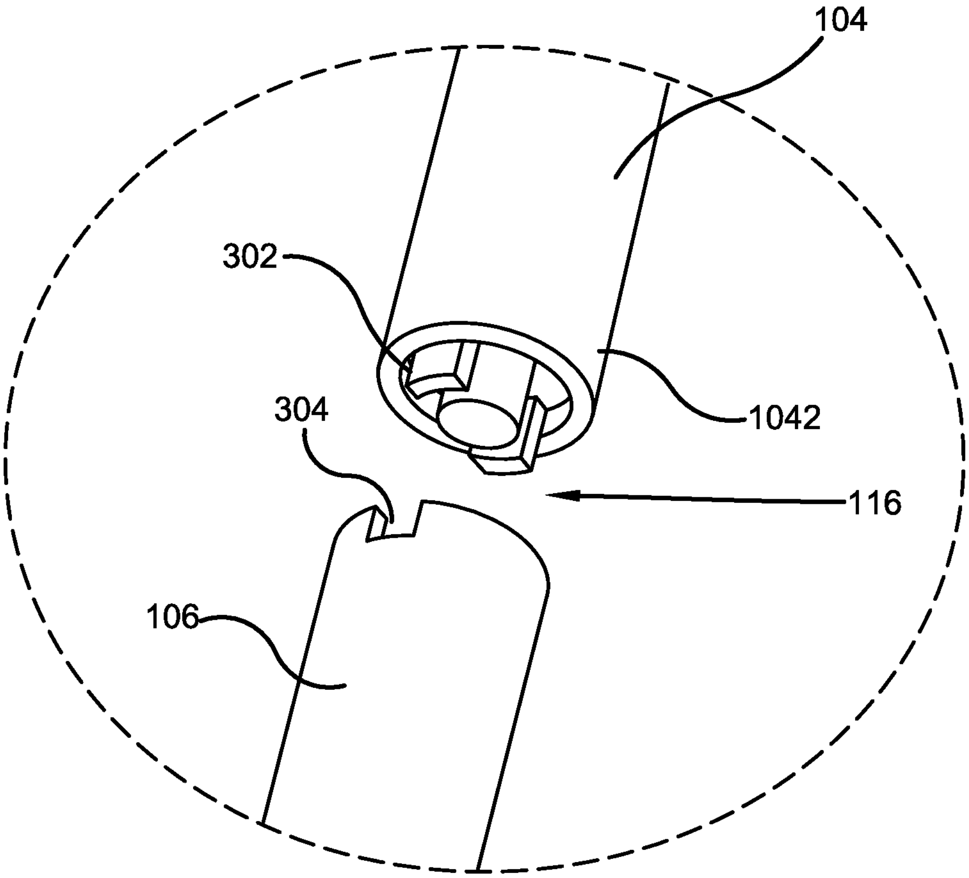
FIG. 3 illustrates an enlarged view of a detachable connection of the telescopic pole and the swivel of the pivotable and telescoping paint roller frame in accordance with the disclosed architecture.

The adjustable swivel 106 includes an internal ball joint that enables the swivel to rotate ninety-degrees in left and right directions and enables the pole 104 to pivot about a point near the midpoint of the top edge 108, which provides more flexibility with regard to the places that the frame 100 can apply paint or other liquids. The adjustable swivel 106 can be hollow and includes a pole-receiving opening 116 that is dimensioned and configured to receive the projection end 1042 of the telescopic pole 104. The details of the connection of the projection end 1042 with the swivel 106 are best illustrated in FIG. 3. At the other end, the swivel 106 is integrated to the mounting assembly 114. The pole 104 can be locked into the pole receiving opening 116 using a twist-lock feature that secures the pole 104 to the swivel 106. Once the pole 104 is secured to the opening 116, the pole 104 can be held by a user enabling the adjustable paint roller frame device 100 to paint any surface easily and conveniently.

The handle or pole 104 can be provided in the form of an extended handle for reaching inaccessible places, or may just be of normal length, while providing the facility for the head section 102 to be rotated with respect to the pole 104 into a variety of positions for ease of use.

To facilitate an even distribution of paint on a surface, the frame 100, including the handle 104 and head section 102, can be formed from a resilient material, such as aluminum or a polymer compound.

Figure 2:
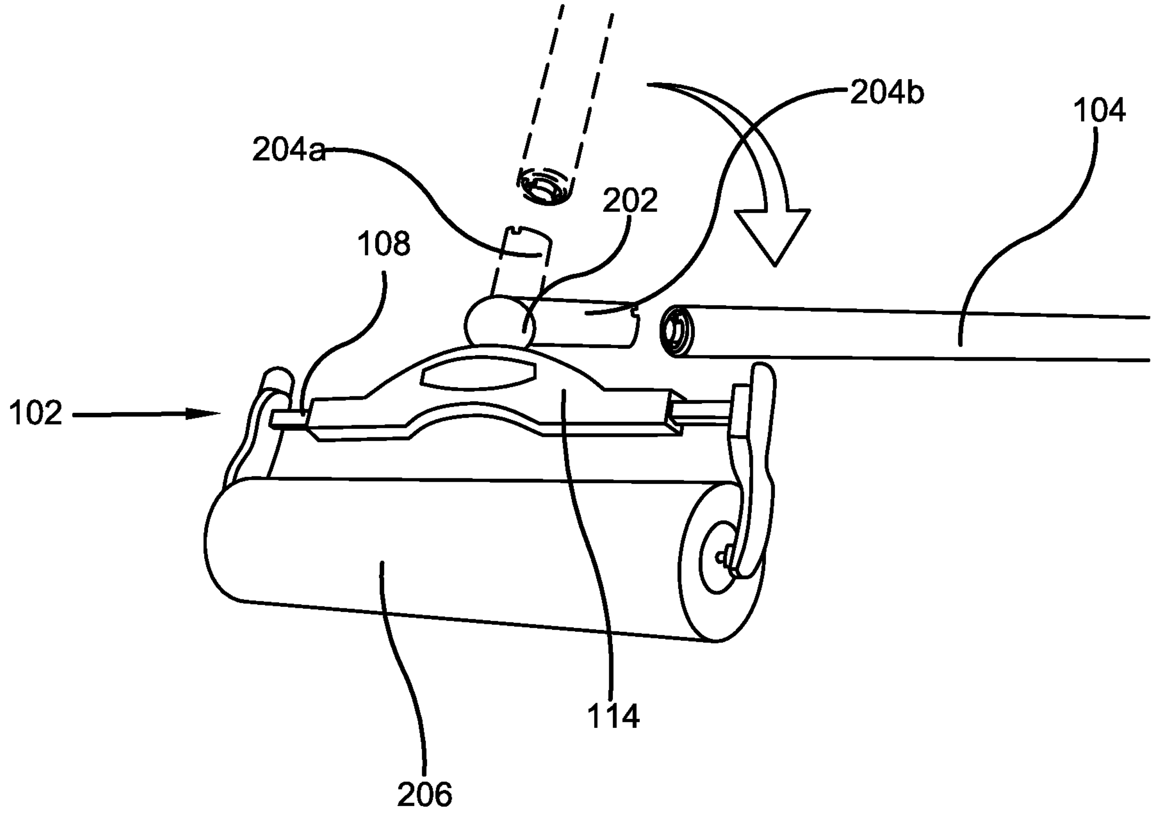
FIG. 2 illustrates a perspective view showing how the adjustable swivel is rotated ninety degrees, thereby enabling the pole to swivel relative to the head section of the adjustable paint roller frame device of the present invention in accordance with the disclosed architecture.

FIG. 2 illustrates a perspective view showing how the adjustable swivel is rotated ninety degrees enabling the pole to swivel relative to the head section of the adjustable paint roller frame device 100 of the present invention in accordance with the disclosed architecture. The swivel 106 includes an internal ball joint 202 that enables rotation of the swivel 106. Initially, the swivel 106 is positioned perpendicular to the top edge 108 of the head section 102 as shown by position 204*a*, and is rotated up to ninety degrees to align with the mounting assembly 114 as shown by position 204*b*. The swivel coupling of the pole 104 and the head section 102, facilitated by the swivel 106, enables a user to paint hard to reach areas. The swivel 106 can be rotated with the pole 104 inserted into the pole receiving opening 116 or can also be rotated when the pole 104 is not inserted into the swivel 106. The swivel 106 provides the operator with convenience of use as it relates to maneuverability and mobility of the head section 102. The frame device 100 can be easily changed in order to reach those difficult spots and smallest corners.

It should be appreciated that while rotating the swivel 106 from position 204*a* to 204*b* and vice versa, the mounting assembly 114 and the roller cover 206 need not be removed. This enables a quick swivel action for a user to apply a paint or liquid using the roller cover or paint roller 206 on any surface and in any orientation.

FIG. 3 illustrates an enlarged view of the detachable connection of the telescopic pole 104 and the swivel 106 of the pivotable, swivelable and telescoping paint roller frame 100 in accordance with the disclosed architecture. As stated earlier, the projection end 1042 of the telescopic pole 104 can be inserted and secured to the swivel 106 through the pole receiving opening 116. For a secure connection of the pole 104 with the swivel 106, the projection end 1042 of the pole 104 includes a plurality of locking tabs shown through an exemplary locking projection 302 that are secured and locked into a plurality of locking slots shown through an exemplary locking slot 304, wherein the locking slots are positioned at the periphery of the pole-receiving opening 116. The pole 104 can be inserted into the swivel 106 with the projection end 1042 and the pole 104 can be secured to the swivel 106 using the locking projection 302 received by the locking slots 304. For securing the pole 104, the locking tabs 302 are aligned with the locking slots 304 such the corresponding locking projection or locking tab 302 and locking slot 304 are secured and locked to each other. As can be appreciated, the aforementioned provides a simple mechanism for securing of the pole 104 to the swivel 106.

It should be appreciated that any pole that has a projection end having projection locks can be used with the swivel 106 and accordingly can form a part of the unique paint roller frame 100 of the present invention.

Figure 4:
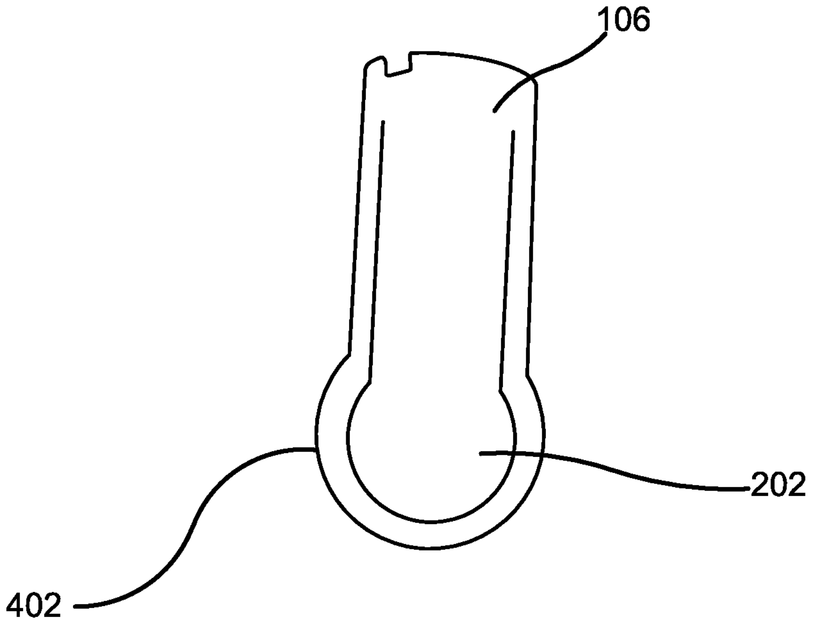
FIG. 4 illustrates a perspective view illustrating the structure of the ball joint that houses the swivel for pivoting the pole or handle in accordance with the disclosed architecture.

FIG. 4 illustrates a perspective view showing the structure of ball joint that maintains the swivel 106 for pivoting the pole or handle 104 in accordance with the disclosed architecture. As described supra, the connection between the handle 104 and the head section or head frame 102 can be provided as a ball and socket-type joint that supports and seats the swivel 106. The ball joint 202 is jammed or affixed into a socket or cup-like area 402. The ball member 202 can be constructed of a hard material that has a sufficient elasticity to allow expansion and contraction of the ball member 202 to enable movement of the swivel joint 106 into its preferred positions of up to ninety degrees in either direction. The socket or cup area 402 can be integrally attached to the mounting assembly of the frame device 100. The socket 402 formation is designed to receive the ball member 202. It is to be appreciated that due to the ball and cup socket configuration, the handle 104 and the head section 102 are tiltable throughout a range of 180 degrees. The tilting or swiveling range of motion can be generally about 90 degrees on either side of vertical.

Figure 5:
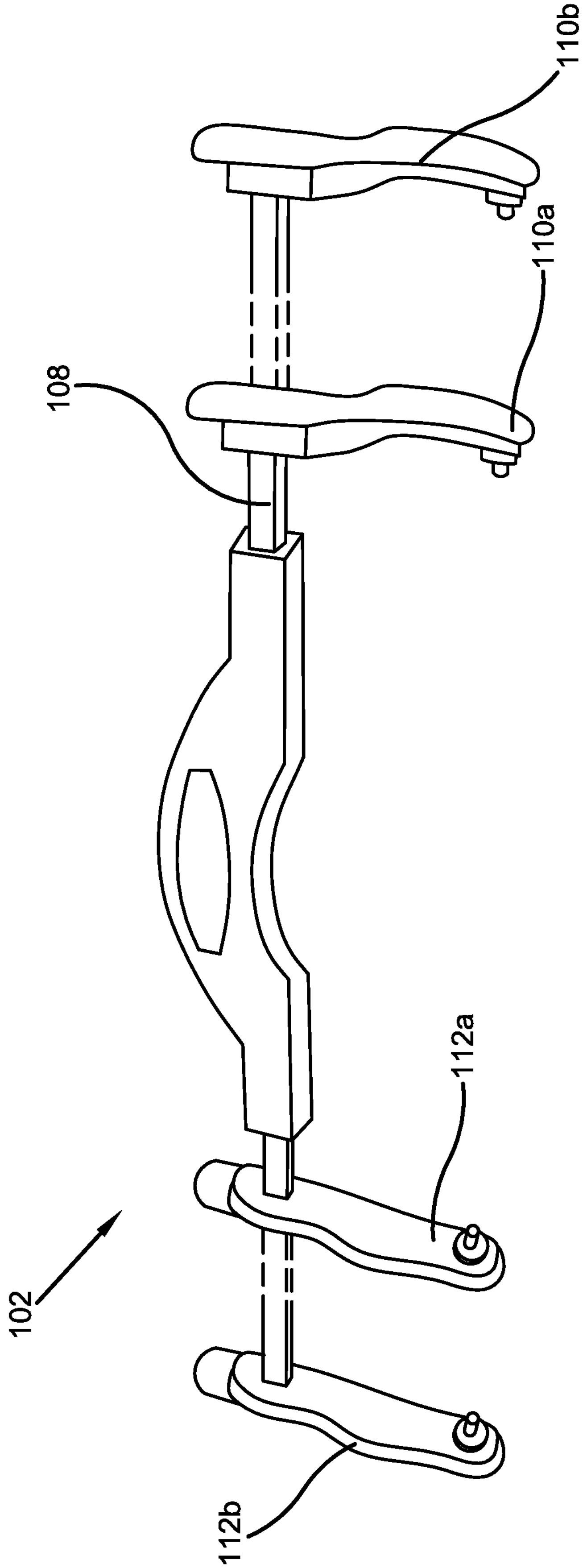
FIG. 5 illustrates a perspective view showing extension of the telescopic top edge of the head section for accommodating paint roller covers of different sizes in accordance with the disclosed architecture.

FIG. 5 illustrates a perspective view showing extension of the telescoping top edge 108 of the head section 102 for accommodating paint roller covers or paint rollers of different sizes in accordance with the disclosed architecture. The top edge 108 of the head section 102 is telescopic, enabling a user to adjust the length or spacing of the top edge 108 to accommodate use of paint rollers of various sizes and lengths. The aforementioned obviates the need of carrying multiple head sections or complete roller frames. In use, the connectors 110, 112 are at an initial position shown as 110*a*, 112*a*, respectively, to accommodate a regular or first length paint roller. For accommodating a longer or bigger roller, the connectors can be pulled away from each other, enabling the length of the top edge 108 to increase, whereby the connectors attain the position 110*b*, 112*b* respectively. The top edge 108 includes telescoping slots that allow the length to adjust. Similarly, to decrease the length of the top edge 108, the connectors can be pushed towards each other enabling the head section 102 to accommodate a smaller paint roller.

Figure 6:
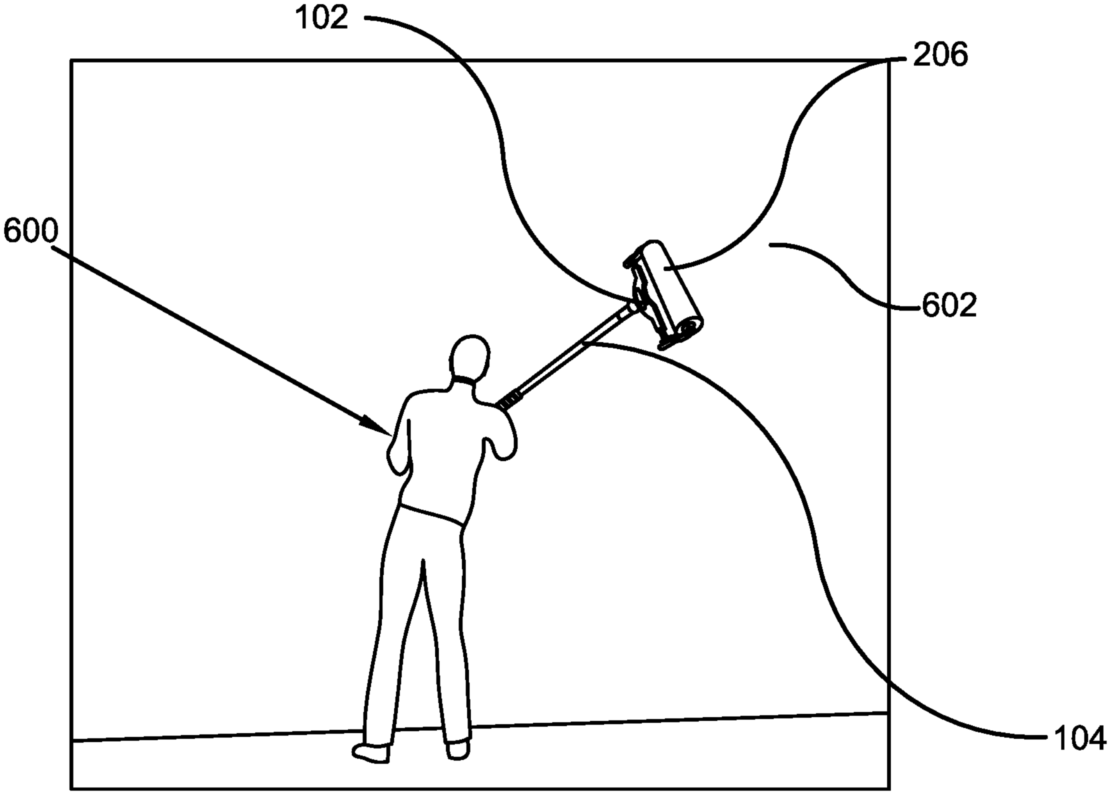
FIG. 6 illustrates a perspective view showing an operator using the modified paint roller frame of the present invention for painting a wall in accordance with the disclosed architecture.

FIG. 6 illustrates a perspective view showing an operator using the modified paint roller frame 100 of the present invention for painting a wall in accordance with the disclosed architecture. An advantage of the roller frame 100 of the present invention is that handle or pole 104 of various lengths can be removably-attached to the head 102. The head section 102 can swivel, thereby enabling the operator 600 to rotate the attached roller cover 206 generally about ninety-degrees in either direction. The head section maintains an easy-on and easy-off installation of the paint roller cover or paint roller 206 to prevent excessive mess and waste. The frame 100 saves time when edging and 'cutting' while painting wall and ceiling intersections and other distinguishing paint lines, improving overall workflow when painting the wall 602.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "modified paint roller frame", "pivotable and telescoping paint roller frame", "adjustable paint roller frame device", "paint roller frame", "frame", and "frame device" are interchangeable and refer to the adjustable paint roller frame device 100 of the present invention.

Notwithstanding the forgoing, the adjustable paint roller frame device 100 of the present invention can be of any suitable size and configuration as is known in the art without affecting the overall concept of the invention, provided that it accomplishes the above-stated objectives. One of ordinary skill in the art will appreciate that the size, configuration, and material of the adjustable paint roller frame device 100 as shown in the FIGS. are for illustrative purposes only, and that many other sizes and shapes of the adjustable paint roller frame device 100 are well within the scope of the present disclosure. Although the dimensions of the adjustable paint roller frame device 100 are important design parameters for user convenience, the adjustable paint roller frame device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An adjustable paint roller frame device comprising:

a paint roller frame comprised of a telescoping head section and a telescoping pole section;

wherein said telescoping head section is for securing a paint roller;

wherein said telescoping pole section comprises a handle comprising an ergonomic grip at one end and a receiving opening comprising a pair of locking projections at an opposing end;

wherein said telescoping head section comprises a swivel comprising a socket, a ball positioned and rotatable within the socket, and a pole receiving opening comprising a pair of locking slots configured to mate with the pair of locking projections of the telescoping pole section;

wherein said swivel rotates said telescoping head section in a range of motion generally from about 90-degrees left to about 90-degrees right relative to said telescoping pole section; and said rotation of said telescoping head section enables a user to rotate said telescoping head section relative to said telescoping pole section to obtain a desired degree of paint angle.

2. The adjustable paint roller frame device of claim 1, wherein said telescoping head section is selectively adjustable in length for receiving a variety of paint roller lengths therein.

3. The adjustable paint roller frame device of claim 1, wherein said telescoping head section includes a pair of paint roller connectors extending from opposing ends for retaining the paint roller therebetween.

4. The adjustable paint roller frame device of claim 1, wherein said telescoping head section and said telescoping pole section comprise a material selected from a group consisting of a polymer and an aluminum metal.

5. The adjustable paint roller frame device of claim 1, wherein said pair of locking slots and said pair of locking projections include a twist-lock.

6. An adjustable paint roller frame device comprising:

a paint roller frame comprising a telescoping head section and a telescoping pole section;

wherein said telescoping head section is for securing a paint roller;

wherein said telescoping pole section comprises a handle comprising a receiving opening comprising a pair of locking projections at one opposing end;

wherein said telescoping head section comprises a swivel comprising a socket, a ball positioned and rotatable within the socket, and a pole receiving opening comprising a pair of locking slots configured to mate with the pair of locking projections of the telescoping pole section;

wherein said ball joint rotates said telescoping head section in a range of motion generally from about 90-degrees left to about 90-degrees right relative to said telescoping pole section;

wherein said ball pivots said telescoping head section at a midpoint relative to said telescoping pole section; and said rotation and said pivoting of said telescoping head section enables a user to rotate said telescoping head section relative to said telescoping pole section to obtain a desired degree of paint angle; and wherein said pair of locking slots and said pair of locking projections include a twist-lock; and wherein said telescoping head section and said telescoping pole section are each further comprised of a polymer material.

7. The adjustable paint roller frame device of claim 6, wherein said telescoping head section is selectively adjustable in length for receiving a variety of paint roller lengths therein.

8. The adjustable paint roller frame device of claim 7, wherein said telescoping head section includes a pair of paint roller connectors extending from opposing ends for retaining the paint roller therebetween.

9. The adjustable paint roller frame device of claim 8, wherein said handle includes an ergonomic grip.

10. An adjustable paint roller frame device comprising:

a paint roller frame comprises a telescoping head section and a telescoping pole section;

wherein said telescoping head section is selectively adjustable in length for receiving a variety of paint roller lengths therein;

wherein said telescoping pole section comprises a handle comprising an ergonomic grip at one end and a receiving opening comprising a pair of locking projections at an opposing end;

wherein said telescoping head section comprises a swivel comprising a socket, a ball positioned and rotatable within the socket, and a pole receiving opening comprising a pair of locking slots configured to mate with the pair of locking projections of the telescoping pole section;

wherein said ball rotates said telescoping head section in a range of motion generally from about 90-degrees left to about 90-degrees right relative to said telescoping pole section;

wherein said ball pivots said telescoping head section at a midpoint relative to said telescoping pole section; and said rotation and said pivoting of said telescoping head section enables a user to rotate said telescoping head section relative to said telescoping pole section to obtain a desired degree of paint angle; and wherein said ball is configured to expand and retract to enable movement of the ball within the socket.

11. The adjustable paint roller frame device of claim 10, wherein said telescoping head section includes a pair of paint roller connectors extending from opposing ends for retaining the paint roller therebetween.

12. The adjustable paint roller frame device of claim 11, wherein said telescoping head section and said telescoping pole section are comprised of a material selected from a group consisting of a polymer and an aluminum metal.

* * * * *